United States Patent Office 2,973,980
Patented Mar. 7, 1961

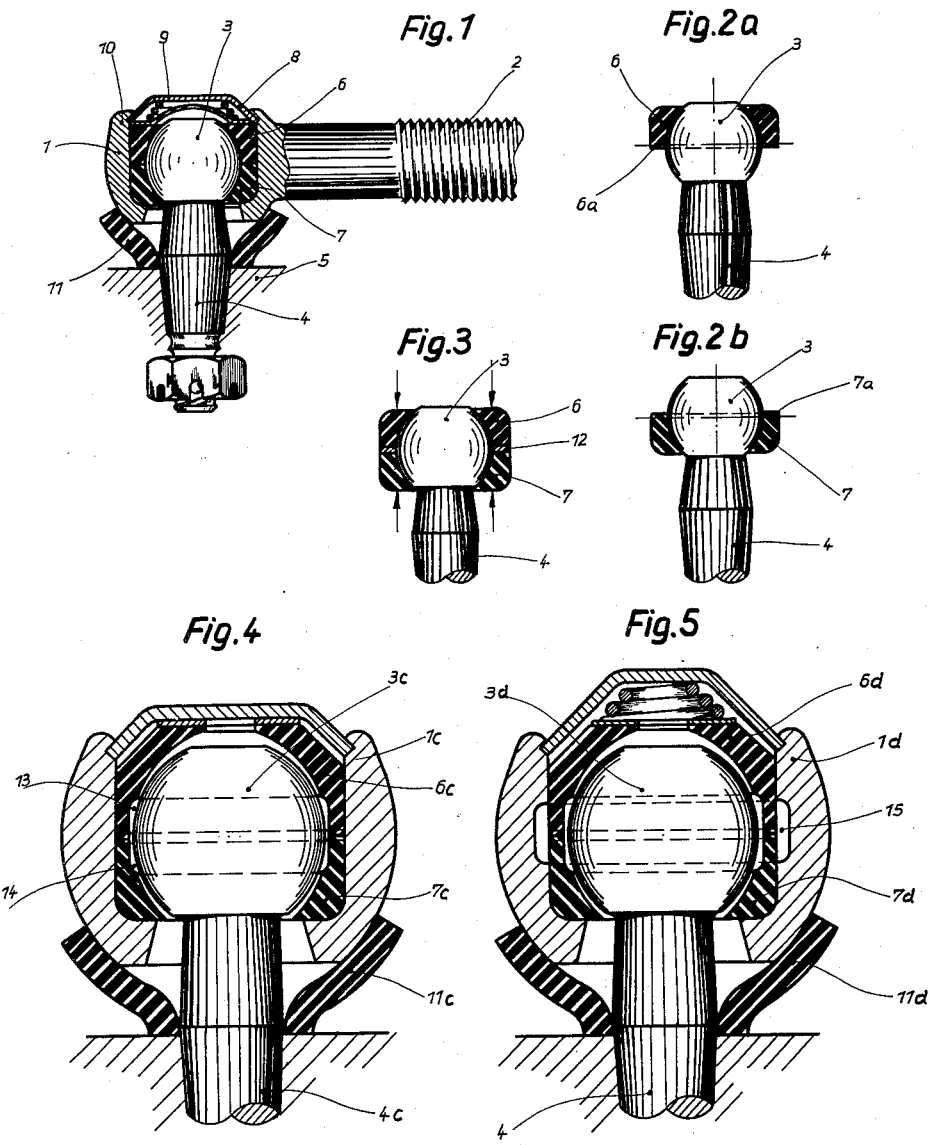

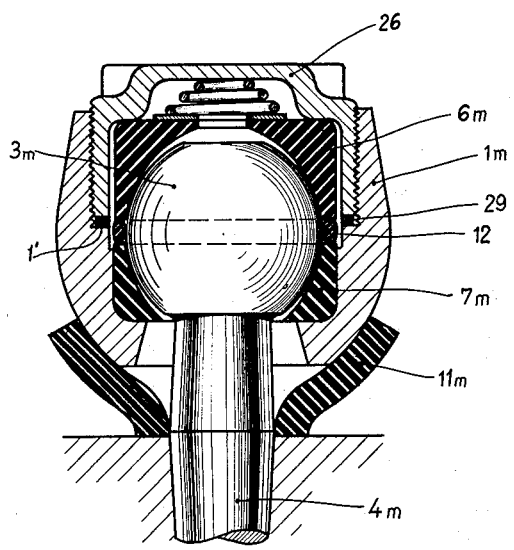
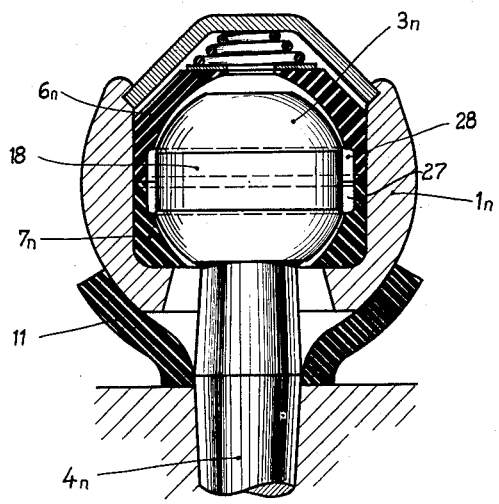

2,973,980

BALL JOINT, ESPECIALLY FOR THE STEERING SUSPENSION OF MOTOR VEHICLES

Jakob F. J. Vogt and Josef H. Latzen, Dusseldorf-Oberkassel, Germany, assignors to A. Ehrenreich & Cie., Dusseldorf-Oberkassel, Germany Filed Sept. 19, 1955, Ser. No. 535,241

Claims priority, application Germany Mar. 16, 1955

7 Claims. (Cl. 287—87)

The present invention relates to a ball joint, especially for the steering suspension or tie-rods of motor vehicles. It is known to provide such ball joints with an elastic ball cup or socket. Such constructions have the great advantage that a special servicing of the joints is not necessary. Consequently the joints can be designed completely closed and thereafter need not be lubricated. However, such constructions have the drawback that for purposes of assembling the joint or bearing, too high pressure is employed so that there exists the possibility that the elastic cups or sockets might be jammed in between the ball head and the casing. When this occurs, the friction of such bearing may exceed the permissible value so that the bearing becomes useless.

It is, therefore, an object of the present invention to provide a ball joint for the above mentioned purpose which will overcome the drawbacks outlined above.

It is another object of this invention to provide a ball joint, especially for the steering suspension or tie-rods of motor vehicles, in which the cups or sockets can be pressed into the ball head and casing in such a manner that the pressure can be varied in conformity with the desired conditions of friction.

It is still another object of this invention to provide a ball joint of the type set forth in the preceding paragraphs, in which the cups or sockets can be secured against rotation in a very simple manner.

These and other objects and advantages of the invention will appear more clearly from the following specification in connection with the accompanying drawings, in which:

Fig. 1 shows partly in section and partly in view a first embodiment of a ball joint according to the invention.

Figs. 2a and 2b show a detail of the ball joint illustrated in Fig. 1.

Fig. 3 represents a modification of the arrangement shown in Figs. 2a and 2b.

Fig. 4 illustrates on a somewhat larger scale than Figs. 1 to 3 a ball joint similar to that of Fig. 1 with a slight modification of the ball sockets.

Fig. 5 differs from that of Fig. 1 primarily in that the casing is provided with an annular recess adjacent the central zone of the ball head.

Figure 6:
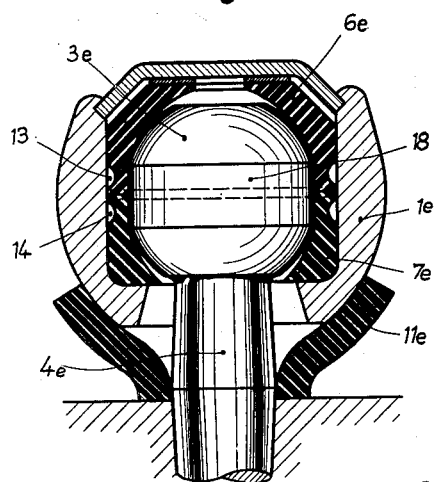

Fig. 6 shows a different arrangement of annular recess means over the recess means shown in Fig. 5.

Figure 7:
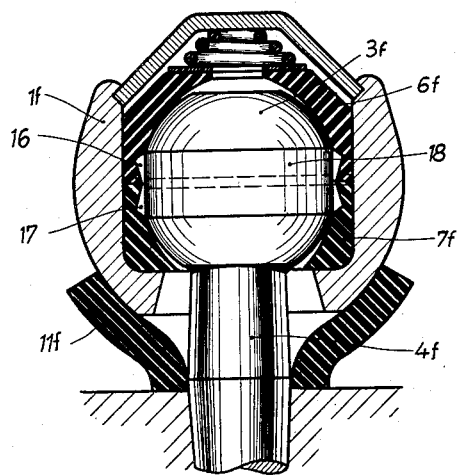

Fig. 7 differs from that of Fig. 6 in the arrangement of the annular grooves near the line of separation between the sockets.

Figure 8:
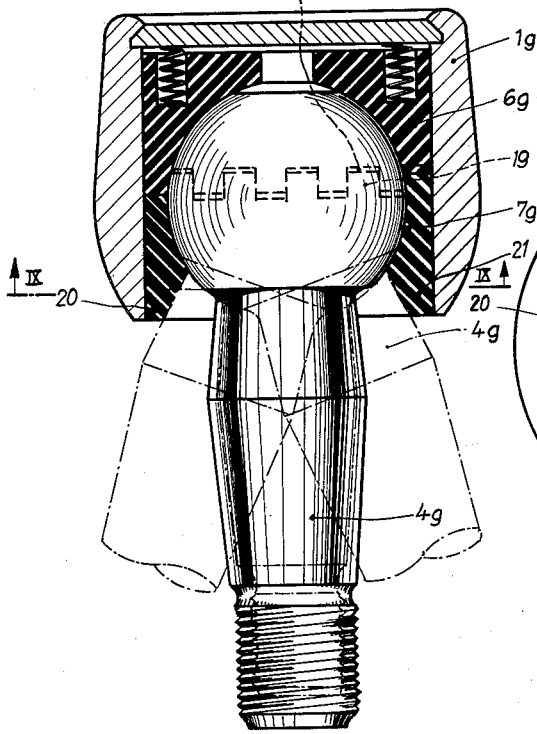

Fig. 8 shows a ball joint in which the ball sockets are provided with teeth engaging each other.

Figure 9:
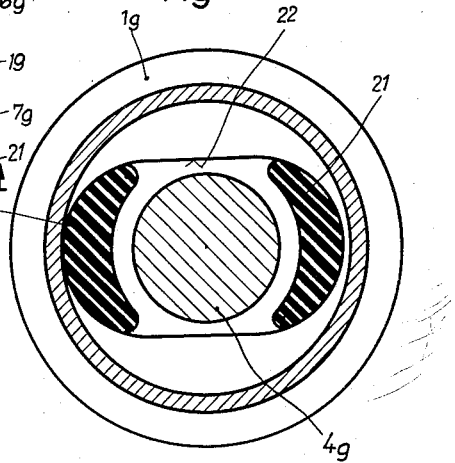

Fig. 9 is a horizontal section along the line IX—IX of Fig. 8.

Figure 10:
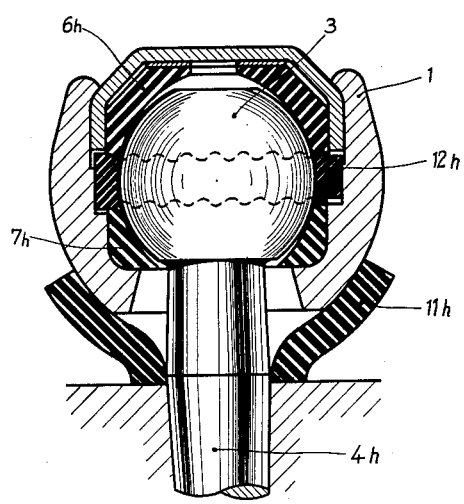

Fig. 10 shows an arrangement according to which an intermediate ring is interposed between the two ball sockets.

Figure 11:
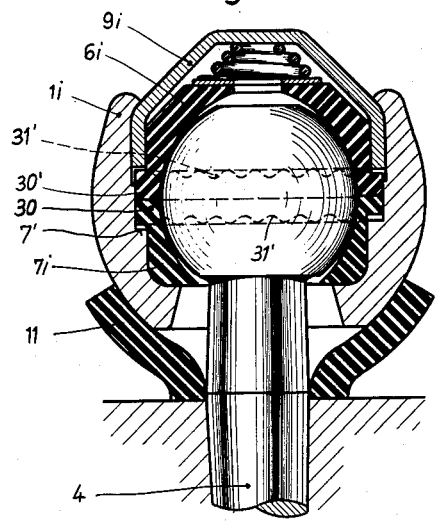

Fig. 11 shows the ball sockets provided with flanges having undulated surfaces.

Figure 12:
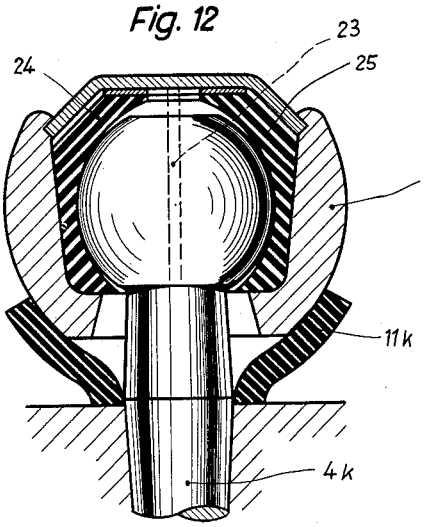

Fig. 12 illustrates a ball joint according to the invention, in which the spacing between the ball sockets is located in a vertical plane.

Figure 13:
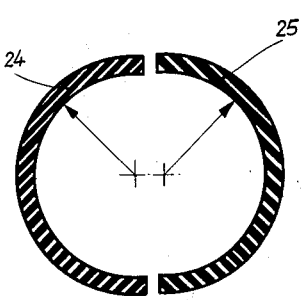

Fig. 13 is a section taken along the line XIII—XIII of Fig. 12.

Figs. 14 and 15 illustrate further modifications of the invention.

*General arrangement*

In order to overcome the above outlined drawbacks of heretofore known ball joint constructions, it is suggested according to the present invention, when assembling a socket unit comprising the two ball cups or sockets, to compress the unit by pressing the cups against each other in a direction perpendicular to the line of separation between said two ball joint sockets so that already during the assembly of said ball joint sockets a certain force or pressure has to be overcome in order to cause the sockets to rest against the ball of the ball joint. This pressure can be selected in conformity with the desired conditions of friction. In this way, the strong wedging effect due to the compression of the sockets is avoided whereas on the other hand the frictional values can be selected in conformity with the extent to which the sockets are compressed.

The compression of the socket unit can be effected in various manners. Advantageously, the sockets are extended beyond the center of the ball-shaped head so that these extensions will allow a compression of the sockets for causing the same to rest against the ball-shaped head. When these extensions engage, prior to compression, the socket unit will be spaced from the ball in the direction of the line of force, so that when a force is applied on transverse surfaces on opposite ends of the unit, substantially all of the force will be transmitted through the socket unit and not to the ball head. The only force exerted by the socket unit on the ball head will be the lesser one due to distortion of the material acting in substantially a radial direction. Transmitting the compressive force through the material instead of the ball-shaped head avoids the much greater radial component of such force on the head which would produce excessive friction between the head and socket. In the joint shown, the material of the cups may be in a state of compression and the friction between the ball and socket unit may be quite small.

Instead of the above mentioned extensions, also rigid or elastic intermediate layers may be provided between the two ball sockets. The thickness of such intermediate layers will indicate the required compressing forces. If a particularly strong compression is desired, a correspondingly thick intermediate layer is interposed between the two ball sockets.

According to a further embodiment of a ball joint according to the invention, the elastic ball socket may be provided with recesses at the line of separation thereof. In this way the abutting portions of the ball sockets have the possibility to expand in order to take up the change in shape brought about by the said compression. It is also possible to provide the abutting surfaces of the elastic ball sockets with teeth, which will likewise yield the possibility of compressing the sockets while they are being assembled. These teeth may, if desired be provided on one socket only whereas the abutment surface of the socket may remain smooth.

With an embodiment of the invention according to which each of the sockets is provided with complementary teeth, the ball sockets having a passage for the stud carrying the ball-shaped head are provided with extensions extending into recesses of the casing of the ball joint. Such an arrangement has the great advantage that the ball cups will be prevented from turning and that in addition thereto the ball head will encounter an elastic abutment if it oscillates very far in its main plane of operation.

Structural arrangement

Referring now to the drawings in detail and Fig. 1 thereof in particular, the ball joint illustrated therein comprises, in a manner known per se a casing 1 provided with a threaded stud 2 by means of which the joint is connected to a rod, link or the like. Arranged in the interior of the casing 1 is a ball head 3 mounted on the stud 4. The stud 4 is connected in an eye 5 or the like in a manner known per se. A socket unit comprising two elastic ball cups or sockets 6 and 7, for instance of synthetic material such as polymeristates, oil resistant rubber, or the like serves for journalling the ball head 3. The said ball cups or sockets 6 and 7 are under the load of a spring 8 which is held in its respective position by means of a cap 9. This cap 9 is held in its position by turning over the upper edge 10 of the casing. Such a bearing or joint does not require servicing and does not have to be lubricated any more during its life. Where the stud 4 enters into the casing 1, it may be protected in a manner known per se against soiling by a sealing cap 11 or the like. In order to avoid jamming or wedging of the ball cups 6 and 7 when assembling the joint, the said two cups are in conformity with Figs. 2a and 2b each provided with an extension 6a, 7a extending beyond the center of the ball head 3. If two of such cups according to Fig. 1 are assembled, the cups are with the illustrated embodiment compressed parallel to the axis of the stud 4 carrying the ball head 3. A wedging will in this way be avoided. The frictional pressure of the joint can be adjusted in conformity with the size of the extensions 6a, 7a.

It is to be understood that it is not necessary to provide each of the two ball sockets with such extensions. It is also possible to provide one of the sockets only with a corresponding extension.

Fig. 3 indicates that instead of providing the ball sockets with extensions, it is also possible to provide a socket unit comprising an annular intermediate layer 12 between the two ball sockets 6 and 7. The said sockets are so designed that when not under load they will reach up to about the center of the ball head 3. When effecting the assembly, the intermediate layer 12 is inserted and the cups are then compressed as indicated in Fig. 3 by means of the arrows. Due to the intermediate layer, i.e. the thickness thereof, a wedging effect will likewise be avoided and it will be possible to adjust the joint for a certain ratio of friction between the socket unit and the ball head.

It will be evident that when selecting the arrangement of Fig. 3, the ball sockets, when in unloaded condition do not have to extend up to the center of the ball head. As a matter of fact the ball sockets may be shorter than would correspond to the height of the ball head. In this instance, the intermediate layers will be designed so as to have a corresponding thickness.

According to Fig. 4, the two ball sockets 6c and 7c are near the line of separation thereof provided with recesses 13 and 14 so that at this point the elastic material can escape laterally when the ball sockets are compressed. The other parts of Fig. 4 corresponding to those of Fig. 1 are provided with the same numerals as Fig. 1 but with the additional letter c. According to the arrangement of Fig. 5, a further recess 15 may be provided in the casing 1d of the ball joint. The other parts of Fig. 5 corresponding to those of Fig. 1 are designated with the same numerals but with the additional letter d. Attention is directed to the fact that in Figs. 4 and 5 and in most of the remaining figures with the exception of Figs. 1 to 3, the ball sockets are shown in a non-compressed condition. When the joint has been assembled, the elastic sockets rest, of course, against the ball head 3 while the spacing between the cups will be reduced in conformity with the desired frictional coefficient up to the complete abutment of the cups against the ball head.

Fig. 6 shows a modification of the arrangement of a recess just referred to inasmuch as according to Fig. 6 annular recesses 13 and 14 are arranged in the two ball sockets 6e and 7e. As will be evident from the drawing, these annular recesses or grooves face the adjacent surface of the casing 1e. The other parts of Fig. 6 corresponding to those of Fig. 1 are provided with the same reference numerals as in Fig. 1 but with the additional character e.

Fig. 7 illustrates an arrangement in which annular recesses 16 and 17 are respectively provided in the cups 6f and 7f and are located between the cylindrical central plane 18 of the ball head 3f and the sockets 6f and 7f. The other parts of Fig. 7 corresponding to those of Fig. 1 are provided with the same reference numeral as in Fig. 1 but with the additional character f.

When as indicated in Fig. 6, the ball sockets rest or abut against the cylindrical central surface 18, the tilting movement of the joint is braked which is desired occasionally, whereas the rotative movement of the joint remains unaffected.

The arrangement shown in Fig. 8 is characterized primarily in that the upper ball socket 6g and the lower ball socket 7g are provided with inter-meshing teeth 19. Thus, the lower socket 7g is for instance provided with teeth 19 engaging corresponding recesses 19' of socket 6g. The dashed double line between the teeth is intended to indicate that it is here where the compression of the ball socket will occur. The said intermeshing will prevent the two ball sockets from turning relative to each other. The type of teeth may be selected at convenience.

According to the arrangements shown in Figs. 8 and 9, the lower ball socket provided with a passage for the stud 4g has extensions 20 and 21. These extensions pass through the lower opening 22 of the casing 1g so that in this way the sockets 6g and 7g are in a very simple manner secured against rotation within the casing 1g.

Fig. 10 shows a modification of a joint according to the invention and is characterized in that a separate intermediate ring 12h is interposed between the ball sockets 6h and 7h. The effect of such intermediate layer has been described above in connection with Fig. 3. According to the arrangement shown in Fig. 10, the surfaces of contact between the ring 12h and the ball sockets 6h and 7h are undulated so that the ring cannot turn with regard to the ball sockets. The remaining parts of Fig. 10 corresponding to those of Fig. 1 have been designated with the same reference numerals but with the additional character h.

According to the arrangement shown in Fig. 11, the sockets 6i and 7i are provided with a flange 30, 30', the outwardly directed annular surfaces of which are provided with an undulation 31', 31'. It is this undulation by means of which the flange 30 of the lower socket 7i rests against a step 7' of the casing 1i whereas the undulated surface 31' of the flange 30' of the upper socket rests against the end face of the closure cap 9i.

With the heretofore known embodiments, the space of separation between the two ball sockets is located in a horizontal plane. However, as indicated in Figs. 12 and 13, the said space of separation may also be arranged in a vertical plane. Thus, Fig. 12 shows a spacing 23 located in a vertical plane. As will be evident particularly from Fig. 13, also in this instance the sockets 24 and 25 are provided with extensions in order to allow a compression of the sockets during the assembly. Otherwise, the effect of this embodiment is similar to that described in connection with the other embodiments. Also with an embodiment shown in Fig. 12, an intermediate member may be provided between the two ball sockets in order to allow a compression in a manner similar to that of a ring. It is also to be understood that the arrangement of Fig. 12 may be provided with teeth similar to that of Fig. 8. The parts 1k, 4k and 11k substantially correspond to parts 1, 4 and 11 of Fig. 1.

Fig. 14 illustrates a ball joint joint with a ring 12 arranged between the upper ball socket 6m and the lower ball socket 7m similar to the arrangement of Fig. 3. With this arrangement, the cap 26 to be screwed into the casing 1m presses upon the upper ball socket 6m in order in this way to furnish the necessary pressure. Advantageously, a second pressure ring 29 is interposed between the annular surface of the cap 26 and the shoulder 1' of the casing 1m. The threaded cap 26 is screwed against the said pressure ring 29. The remaining parts of Fig. 14 corresponding to those of Fig. 1 are designated with the same reference numerals as Fig. 1 but with the additional character m.

Finally with regard to Fig. 15, this figure illustrates a modification of the arrangements shown in Figs. 6 and 7. According to Fig. 15, the ball head 3n is likewise provided with a cylindrical central portion 18. However, by differently designing the ball sockets, corresponding spaces or chambers 27, 28 can be created between the ball head 3n and the sockets 6n and 7n which spaces or chambers will take up the bulges of the sockets 6n and 7n when the same are compressed.

It is, of course, understood that the present invention is, by no means, liimted to the particular construction shown in the drawings but also comprises any modifications within the scope of the appended claims.

What we claim is:

1. In a ball joint, especially for use in connection with the steering system of motor vehicles, the combination of: a casing having a transverse internal abutment at one end, a stud having a ball head connected thereto and arranged within said casing, a pair of ball cups of elastic compressible material, said ball cups being complementary to each other and mounted in said casing so that the compressible material of said cups directly engages and supports said ball head, means securing said cups within said casing and having a transverse internal abutment parallel to and facing said internal abutment on said casing, said ball cups having their inner ends provided with annular recess means adjacent to and facing the central section of said ball head and their internal surfaces spaced from said ball head at each end before compression, said cups being compressed between said internal abutments with their internal surfaces in contact with said head.

2. In a ball joint, especially for use in connection with the steering system of motor vehicles, the combination of: a stud having a ball head connected thereto, resilient ball cup means provided with a complementary ellipsoidal configuration interiorly thereof for engagement with said ball head, the curvature of said ellipsoidal configuration corresponding substantially to that of said ball head, said ball cup means being so dimensioned that in a non-loaded condition corresponding centers of curvature of said ellipsoidal configuration will be located in spaced relationship on opposite sides of a horizontal plane passing through the center of said ball head, said plane and said configuration being spaced from the ends of said ball head, and a casing housing said ball means and having transverse abutments engaging the ends of said cups and compressing said cups against each other tending to cause said inner surfaces to contact said ball head at the ends thereof.

3. The structure set forth in claim 2 wherein said head comprises a first section with a spherical surface, a second section with a spherical surface and an intermediate cylindrical section interconnecting said first and second sections; wherein said ball cup means comprise a pair of elastic ball cups complementary to each other and mounted in said casing for supporting said head, said cups facing each other along a plane passing through said cylindrical section and being compressed in a direction perpendicular to said plane, and means securing said cups within said casing.

4. The structure set forth in claim 2 wherein said casing is provided with a first bore and a second bore wider than said first bore and provided with a thread, said second bore having an annular bottom, said stud ball head arranged within said casing, said resilient ball cup means comprising a first elastic ball cup mounted in said first bore for supporting one section of said head, and a second elastic ball cup arranged within said second bore but spaced therefrom, first washer means interposed between and engaged by said first and second cups, cap means having a shoulder for engagement with said second cup and having a skirt surrounding said first cup and threadedly engaging said threaded second bore of said casing, second washer means interposed between the innermost end surface of sad skirt and the bottom of said second bore, and yielding means interposed between said cap means and said second cup.

5. In a ball joint for use in connection with the steering system of motor vehicles, the combination of: a stud having a ball head connected thereto, two elastic compressible ball cups arranged in substantially axial alignment with each other and provided with complementary inner hemispherical surfaces and with complementary inner annular recesses near the inner end portions of said ball cups, said ball cups before compression having the adjacent ends of their hemispherical surfaces in engagement with said ball head and having the remote ends of their hemispherical surfaces spaced from said ball head so as to confine therewith chambers, the inner ends of said ball cups being so designed that when they engage each other in semi-assembled condition the inner ends of at least one of said ball cups extends beyond the plane passing through the center of curvature of said ball head and transverse to the longitudinal axis of said stud when the latter is in its vertical position, and a housing member having spaced transverse abutments engaging the remote ends of said cups and compressing said cups against each other to cause said remote ends to contact said ball head and surrounding said ball cups, said annular recesses near the inner end portions of said ball cups being greater than the cross section of said inner end portions whereby material of said inner end portions can escape into said annular recesses when those portions of the hemispherical ball cup surfaces which are not in engagement with said ball head are pressed into engagement therewith.

6. In a ball joint, especially for use in connection with the steering system of motor vehicles, the combination of: a stud having a ball head connected thereto, two elastic compressible ball cups arranged in substantially axial alignment with each other and provided with complementary hemisphercial inner surfaces for engagement with said ball head, the radius of curvature of each of said inner surfaces corresponding substantially to that of said ball head, said ball cups being so dimensioned that when resting against each other in semi-assembled condition along a plane passing through the center of said ball head, the center of curvature of their hemispherical inner surfaces will be located in spaced relationship to and on opposite sides of said plane and said inner surfaces will be spaced from said ball head at the ends, said cups being recessed adjacent their inner ends, and a casing housing said ball cups and having transverse abutments engaging the ends of said cups and compressing said cups against each other to cause said inner surfaces to contact said ball head at the ends.

7. In a ball joint, especially for use in connection with the steering system of motor vehicles, the combination of: a stud having a ball head connected thereto, two elastic compressible ball cups arranged in substantially axial alignment with each other and provided with complementary hemispherical inner surfaces for engagement with said ball head, the radius of curvature of each of said inner surfaces corresponding substantially to that of said ball head, said ball cups being so dimensioned that when resting against each other in semi-assembled condition along a plane passing through the center of said ball head, the center of curvature of their hemispherical inner surfaces will be located in spaced relationship to and on opposite sides of said plane and said inner surfaces will be spaced from said ball head at the ends, the inner spherical surfaces of said cups being recessed adjacent the inner ends of said cups, and a casing housing said ball cups, and having transverse abutments engaging the ends of said cups and compressing said cups against each other to cause said inner surfaces to contact said ball head at the ends.

References Cited in the file of this patent

UNITED STATES PATENTS

| | | |
|---|---|---|
| 1,073,264 | Mayer et al. | Sept. 16, 1913 |
| 1,985,728 | Ingersoll | Dec. 25, 1934 |
| 1,989,116 | Strauss | Jan. 29, 1935 |
| 2,061,985 | Sawer | Nov. 24, 1936 |
| 2,324,984 | Brown | July 20, 1943 |
| 2,424,431 | Booth | July 22, 1947 |
| 2,425,138 | Venditty | Aug. 5, 1947 |
| 2,553,689 | Tuck et al. | May 22, 1951 |
| 2,708,590 | Latzen | May 17, 1955 |

FOREIGN PATENTS

| | | |
|---|---|---|
| 140,783 | Australia | Apr. 12, 1951 |